United States Patent [19]
Kikuchi

[11] Patent Number: 4,859,156
[45] Date of Patent: Aug. 22, 1989

[54] COUPLING MECHANISM FOR A COMPRESSOR

[75] Inventor: Kazuto Kikuchi, Isesaki, Japan

[73] Assignee: Sanden Corporation, Gunma, Japan

[21] Appl. No.: 76,852

[22] Filed: Jul. 23, 1987

[30] Foreign Application Priority Data

Jul. 23, 1986 [JP]  Japan .............................. 61-111995[U]

[51] Int. Cl.$^4$ ............................................ F04B 35/00
[52] U.S. Cl. ...................................... 417/319; 403/2; 464/33
[58] Field of Search .................. 192/56 R; 464/33, 32; 403/2, DIG. 3; 417/364, 362, 319; 418/69; 415/9

[56] References Cited

U.S. PATENT DOCUMENTS

| | | | |
|---|---|---|---|
| 272,233 | 2/1883 | Gates | 403/DIG. 3 |
| 292,095 | 1/1884 | Carlson | 464/33 X |
| 463,162 | 11/1891 | McCully | 464/33 X |
| 912,488 | 2/1909 | Richards | 464/33 X |
| 2,384,188 | 9/1945 | Mercier | 464/33 |
| 2,767,658 | 10/1956 | Murray | 417/319 X |
| 3,217,517 | 11/1965 | Warnery | 464/33 |
| 3,433,166 | 3/1969 | Birkemeier | 418/69 X |
| 3,861,829 | 1/1975 | Roberts et al. | 417/53 |
| 3,923,290 | 12/1975 | Tillis | 403/2 X |
| 4,621,982 | 11/1986 | Schulz et al. | 403/2 X |
| 4,697,991 | 10/1987 | Tsukahara et al. | 403/2 X |

*Primary Examiner*—Leonard E. Smith
*Attorney, Agent, or Firm*—Banner, Birch, McKie & Beckett

[57] ABSTRACT

A coupling mechanism for a compressor of an automotive air conditioning system which is provided with a safety mechanism for preventing damage to the engine due to compressor failure. A front end plate with a tubular extension which extends in the direction parallel to the axis of rotation of the drive shaft is attached to one end of the compressor housing. A pulley is rotatably supported on said extension by means of a bearing. At its terminal end, the drive shaft is connected to a plate-like element which includes a centrally located hole through which the drive shaft extends. The plate-like element is connected by means of a bolt and a nut and rotates with the drive shaft. The pulley transmits rotational motion from the engine to the shaft through the plate-like element by means of cylindrical members which are interposed between the pulley and the plate-like element. The cylindrical members are made out of an easily destroyed material. If the compressor malfunctions and the drive shaft stops rotating, damage to the engine is prevented since the torque applied by the pulley on the cylindrical members causes them to break allowing the pulley and the plate-like element to be disconnected. The pulley is then free to rotate independently of the plate-like element and drive shaft.

7 Claims, 2 Drawing Sheets

COUPLING MECHANISM FOR A COMPRESSOR

BACKGROUND OF THE INVENTION

1. Field of Invention

This invention relates to a coupling mechanism for a refrigerant compressor, and more particularly, to a mechanism for disconnecting the drive shaft of the compressor from a drive pulley in the event of a compressor malfunction.

2. Description of the Prior Art

In the standard automotive air conditioning system, an electromagnetic clutch is interposed between the automotive engine and the drive shaft of the compressor to intermittently transmit the rotational driving force of the engine to the shaft. The operation of the electromagnetic clutch is controlled by a change in the operating conditions of the air conditioning system, for example, a change of temperature in the passenger compartment.

In the event of a compressor malfunction, the clutch should operate to disconnect the engine from the compressor to prevent transmission of the rotational driving force from the engine. However, since the clutch is usually loaded in a compressor which has a variable displacement mechanism, which enable the compressor to change its capacity in direct response to changes in operating conditions, the electromagnetic clutch is not necessary to obtain satisfactory control of the refrigeration or temperature condition of the air conditioning system. Nevertheless, it is necessary to provide the compressor with a safety mechanism to prevent damage to other parts of the engine or air conditioning system in the event of a compressor malfunction. The electromagnetic clutch serves as an expensive solution to this problem.

One example of an automotive air conditioning compressor system which has not made use of an electromagnetic clutch is disclosed in U.S. Pat. No. 3,861,829. As shown in the compressor of FIG. 1, pulley 1 is directly connected to the outer terminal end of drive shaft 3 and extends around the outer peripheral surface of tubular extension 2 of drive shaft 3. In this configuration, the rotational driving force of the engine is constantly transmitted to drive shaft 3 through pulley 1 via a drive belt (not shown). Since pulley 1 is never disconnected from drive shaft 3 even in the event of a compressor malfunction, such a malfunction is directly passed on to the driving system of the automobile. Damage on the engine and other parts of the driving system is likely to occur.

SUMMARY OF THE INVENTION

It is an object of this invention to provide a coupling mechanism for a driven member which easily prevents damage to an automotive engine in the event of a malfunction of the driven member. The driven member may be a compressor for an automotive air conditioner.

It is also an object of this invention to provide an inexpensive coupling mechanism for a driven member.

A coupling mechanism for a driven member, for example, a compressor, in accordance with the present invention includes a pulley which is rotatably and peripherally disposed on a surface of the drive shaft which is outside the main compressor housing. A circular plate-like element is fixed to the outer end of the drive shaft. A plurality of cylindrical members are disposed between the inner surface of the plate-like element and the outer surface of the pulley and couple the plate-like element to the pulley. The cylindrical members are made of materials which break easily if a predetermined torque is exceeded. This predetermined torque is exceeded if the operation of the compressor is interrupted preventing the rotation of the drive shaft. If the torque should be exceeded, the cylindrical members break and the connection between the pulley and the driven member or compressor is terminated and the pulley is allowed to rotate freely.

Further objects, features and other aspects of this invention will be understood from the following detailed description of the preferred embodiments to this invention with reference to the drawing figures.

BRIEF DESCRIPTION OF THE DRAWINGS

FIG. 3b is a cross sectional view taken along line A—A of FIG. 3a.

FIG. 4b is a cross sectional view taken along line B—B of FIG. 4a.

DESCRIPTION OF THE PREFERRED EMBODIMENTS

Figure 2:
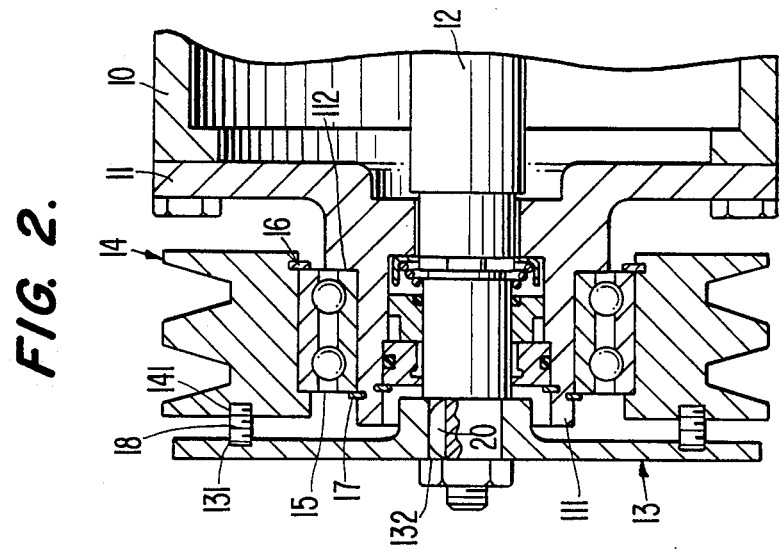
FIG. 2 is a cross sectional view of a coupling mechanism, used on a compressor, in accordance with one embodiment of this invention.
Figure 1:
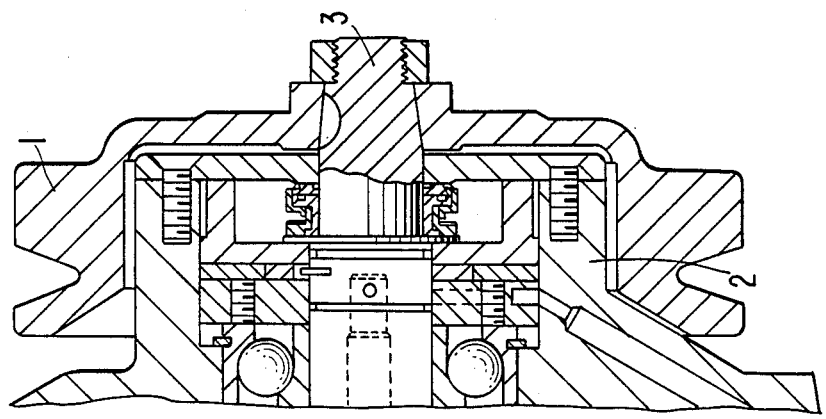
FIG. 1 one is a cross sectional view of a conventional coupling mechanism used on a compressor.
Figure 3A:
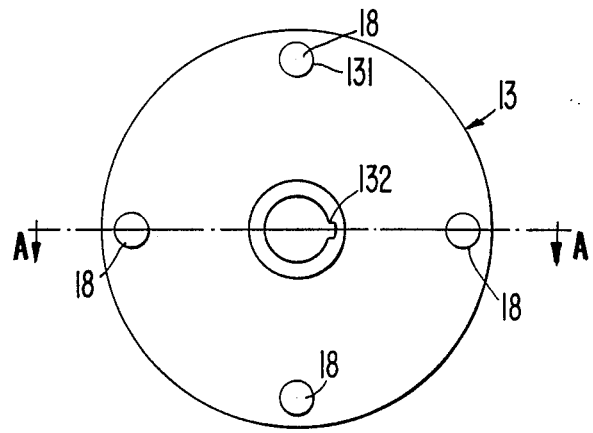
FIG. 3a is a rear end view of a plate-element of the coupling mechanism shown in FIG. 2.
Figure 3B:
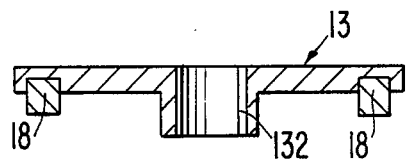

Referring to FIGS. 2 and 3, the construction of a coupling mechanism in accordance with one embodiment of this invention is shown. A coupling mechanism may be installed, for example, on a refrigerant compressor for a automobile air conditioning system. The compressor has compressor housing 10 and front end plate 11 attached to an open end thereof. Drive shaft 12 is rotatably supported within front end plate 11. Tubular extension 11 extends outwardly from front end plate 11 and surrounds drive shaft 12.

Pulley 14 is rotatably supported on the peripheral outer surface of tubular extension 111 through bearing 15. Pulley 14 is securely fitted on the peripheral outer surface of bearing 15 by snap ring 16 disposed between an inner surface of pulley 14 and the inner end surface, with respect to housing 10, of bearing 15. Snap ring 16 prevents pulley 14 from moving in a direction parallel to the rotational axis of drive shaft 12. Bearing 15 is secured between flange 112 and snap ring 17 which is fixed on the peripheral outer surface of tubular extension 111.

Circular plate-like element 13 have a centrally located hole is fixed on a terminal outer end portion of drive shaft 12 by a bolt and a nut. Plate-like element 13 is also coupled with drive shaft 12 by the interaction of key 20 on the end of shaft 12 with key groove 132 in the centrally located hole of plate-like element 13.

Figure 4A:
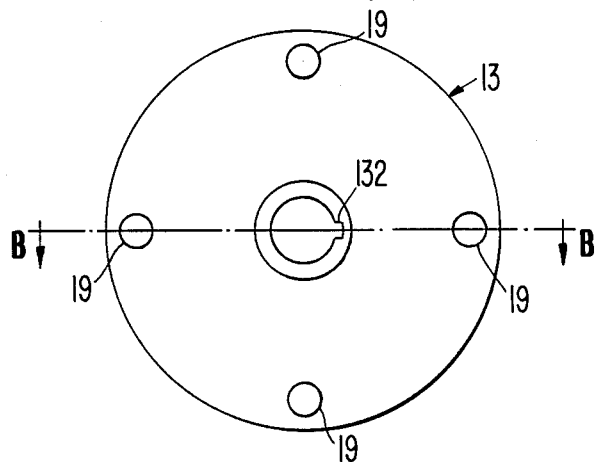
FIG. 4a is a rear end view of a modified plate-like element for a coupling mechanism in accordance with a second embodiment of this invention.
Figure 4B:
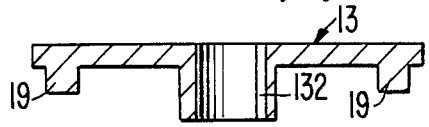

A plurality of cylindrical members 18 are disposed between the inner side surface, with respect to housing 10, of plate-like element 13 and the outer side surface, also with respect to housing 10, of pulley 14 to couple plate-like element 13 to pulley 14. Holes 131 are formed on the inner side surface of plate-like element 13 and one end of each cylindrical member 18 is disposed therein. The other end of each cylindrical member 18 is disposed in corresponding hole 141 formed on the outer side surface of pulley 14. In the second embodiment as shown in FIGS. 4a and 4b, cylindrical members 19 are integrally formed with plate-like element 13.

Cylindrical members 18 or 19 are made of synthetic resins or metals which are easily broken if a large torque acts between pulley 14 and plate-like element 13 that is, a force which acts to rotate pulley 14 with respect to plate-like element 13. Suitable materials for constructing cylindrical members 18 include polyamide, polycarbonate, polyacetal and other engineering plastics, as well as aluminum, iron, lead, bronze and other metals. In the case of the second embodiment, cylindrical members 19 and plate-like element 13 are made of the same material which must be a metal.

In ordinary operation of the coupling mechanism, the driving force of the engine is transmitted to pulley 14 by a belt (not shown), and is then transferred to drive shaft 12 of a compressor through cylindrical members 18 and plate-like element 13. In this manner, drive shaft 12 is driven. If during the operation of the compressor a malfunction occurs, and as a result of the malfunction the rotation of drive shaft 12 is interrupted, the rotational movement of plate-like element 13 is also stopped due to the coupling of the plate-like element 13 with drive shaft 12. However, a large rotational force is still provided to pulley 14 by the engine and pulley 14 provides a large torque to plate-like element 13 through cylindrical members 18. This torque is large enough to destroy cylindrical members 18 because cylindrical members 18 are designed to break when such a torque is received. As a result, pulley 14 is disconnected from plate-like element 13 and is free to rotate without resistance from motionless drive shaft 12 applied through plate-like element 13. The exact value of the torque and thus the size, material and number of cylindrical members 18 or 19 is dependent on the system with which the coupling mechanism is used.

Although cylindrical members 18 are destroyed and must be replaced, cylindrical members 18 are easy to replace and are inexpensive, especially when compared to the cost of an electromagnetic clutch or the cost of repairing damage to the engine. Although in the second embodiment plate-like element 13 must be entirely replaced if broken, the cost of replacement is still much less than the above mentioned clutch or repairs.

This invention has been described in detail in connection with preferred embodiments. These preferred embodiments, however, are merely for example only and this invention is not restricted thereto. For example, although the embodiments have been described with respect to a compressor for an automotive air conditioner, it is clear that they can be used with any driven member. It is easily understood by those skilled in the art that variations and modifications can be easily made within the scope of the invention, as defined by the appended claims.

I claim:

1. A coupling mechanism for a compressor, said compressor comprising a compressor housing having an open end surface, a front end plate attached to said open end surface of said compressor housing, a drive shaft rotatably disposed within said compressor housing, said drive shaft having an outer end portion terminating exterior of said compressor housing, and a tubular extension extending outwardly from said front end plate in a direction parallel to the rotational axis of said drive shaft; and said coupling mechanism comprising a pulley rotatably supported on a peripheral outer surface of said tubular extension, a plate-like element connected to and rotatably with said outer end portion of said drive shaft, and a plurality of cylindrical members integrally formed with said plate-like element on an inner side surface thereof, said cylindrical members fitted into holes formed on an outer side surface of said pulley, said cylindrical members made of materials which are easily broken by a large torque to disconnect said pulley from said plate-like element.

2. A coupling mechanism for a compressor, said compressor comprising a compressor housing having an open end surface, a front end plate attached to said open end surface of said compressor housing, a drive shaft rotatably disposed within said compressor housing, said drive shaft having an outer end portion terminating exterior of said compressor housing, and a tubular extension extending outwardly from said front end plate in a direction parallel to the rotational axis of said drive shaft; and said coupling mechanism comprising a pulley rotatably supported on a peripheral outer surface of said tubular extension, a plate-like element connected to and rotatable with said outer end portion of said drive shaft, and a plurality of cylindrical members disposed between an inner side surface of said rotatable plate-like element and an outer side surface of said pulley, said cylindrical members made of materials which are easily broken by a large torque to disconnect said pulley from said plate-like element.

3. A coupling mechanism as claimed in claim 2 wherein said plate-like element is connected to said drive shaft by means of a bolt and a nut.

4. A coupling mechanism as claimed in claim 2 wherein said cylindrical members are formed of synthetic resins.

5. A coupling mechanism as claimed in claim 4 wherein said resins include polyamide, polycarbonate and polyacetal.

6. A coupling mechanism as claimed in claim 1 wherein said cylindrical members are formed of metals.

7. A coupling mechanism as claimed in claim 6 wherein said metals include aluminum, iron, lead and bronze.

* * * * *